May 31, 1927.
G. W. BENEDICT
1,630,515
REAMING OR BORING TOOL
Filed May 5, 1924   2 Sheets-Sheet 1
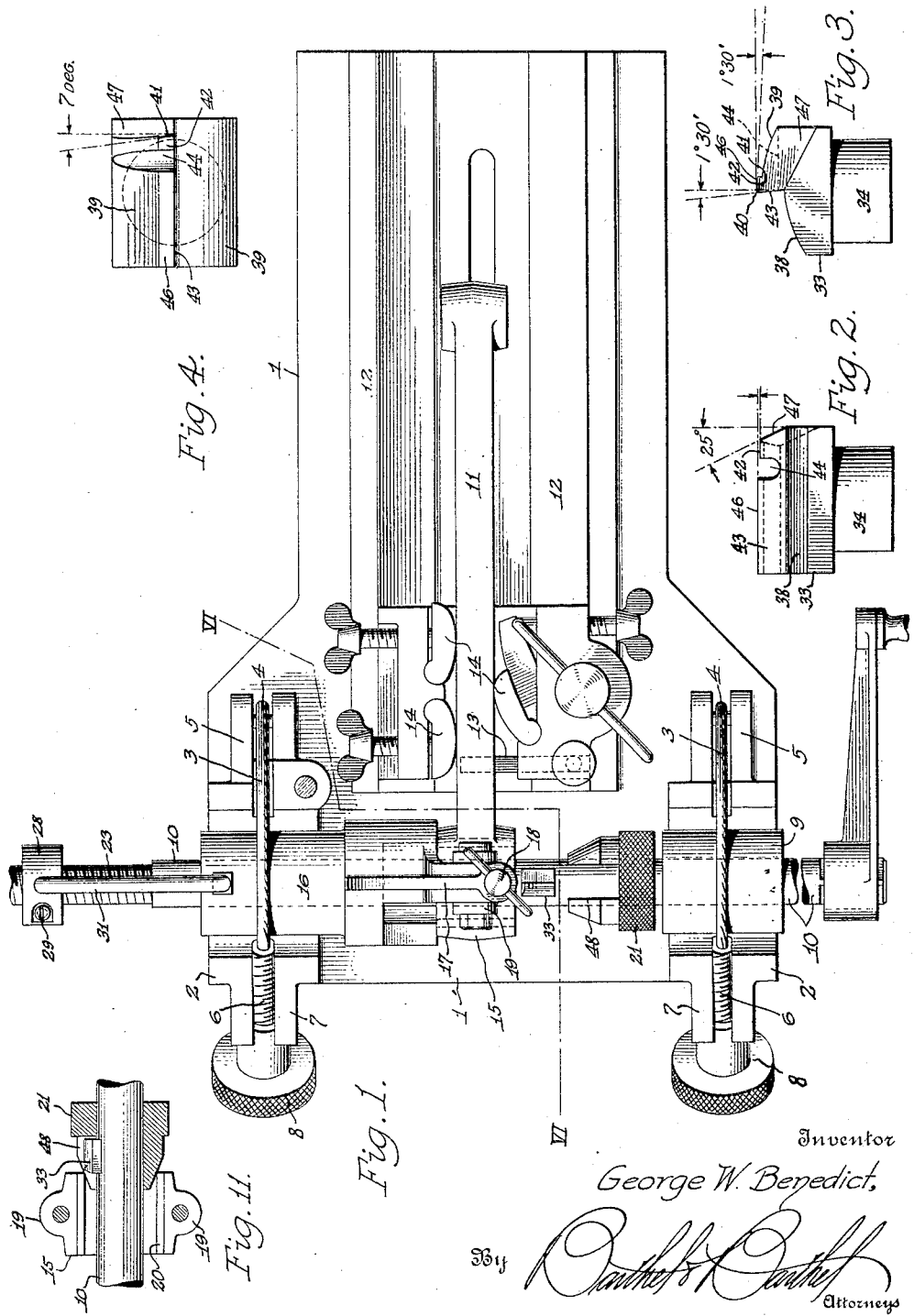

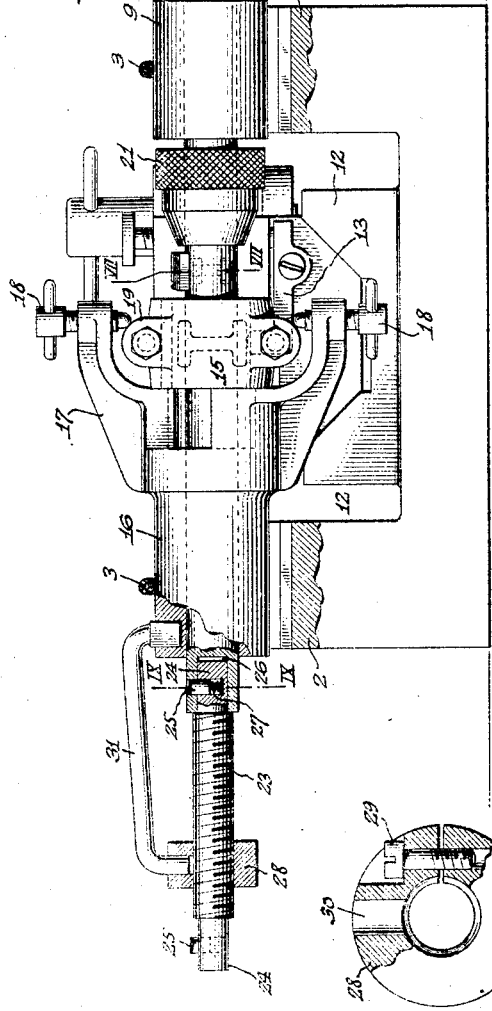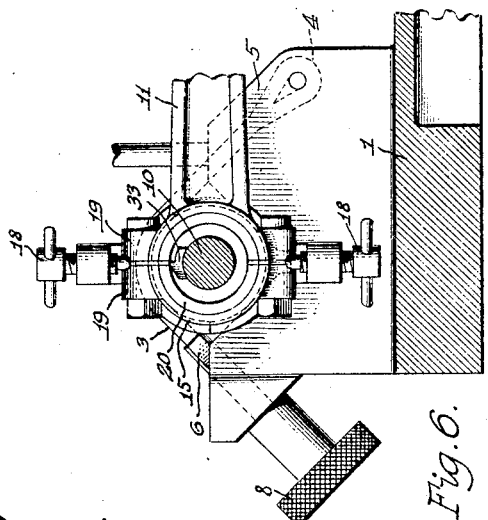

Patented May 31, 1927.

1,630,515

UNITED STATES PATENT OFFICE.

GEORGE W. BENEDICT, OF DETROIT, MICHIGAN, ASSIGNOR TO KENT-MOORE ORGANIZATION, OF DETROIT, MICHIGAN.

REAMING OR BORING TOOL.

Application filed May 5, 1924. Serial No. 711,092.

In my pending application filed Feb. 8, 1924, Ser. No. 691,388, there is disclosed a connecting rod reconditioning machine that may be advantageously used in repair shops for motor repair work in connection with the reaming, straightening and testing of connecting rods for any inaccuracies, and this application is directed to the reaming or boring of the bearings of the connecting rod by utilizing a portion of the reconditioning machine.

The primary object of my invention is to furnish an arbor with a novel reaming or boring instrumentality and progressively shift the arbor in a rod bearing so that a bushing or other member therein may be reamed and the reamed surface burnished so that one operation will finish the bearing for perfect fitting on a crank shaft piston pin or other structure.

Another object of this invention is to provide positive and reliable means for centering and positively holding a connecting bearing relative to a reaming instrumentality so that the bearing may be operated upon with the greatest of precision.

A further object of this invention is to provide simple and durable means for causing a reaming or boring instrumentality to be fed into operation, relative to a bearing, when the reaming or boring instrumentality is rotated, said feeding means being reversible to permit of operations being expeditiously performed.

A further object of this invention is to provide a reaming or boring instrumentality in the form of a bit having a reaming or cutting edge and facets which provide clearance for removed material and afford means of burnishing a reamed or bored surface, the bit performing functions which have heretofore required more than one bit, consequently there is a saving in time and labor when reconditioning the bearings of a connecting rod.

The above are a few of the objects attained by my invention and others will hereinafter appear as the reaming and boring machine is described in detail, by aid of the accompanying drawings wherein Figure 1 is a plan of a part of my reconditioning machine showing a connecting rod in position preparatory to having a bearing thereof reconditioned;

Fig. 2 is a side elevation of a bit constituting part of a reaming and boring instrumentality;

Fig. 3 is an end view of the same;

Fig. 4 is a plan of the bit;

Fig. 5 is an end view of the machine partly in section;

Fig. 6 is a longitudinal sectional view taken on the line VI—VI of Fig. 1;

Fig. 7 is a cross sectional view taken on the line VIII—VIII of Fig. 5;

Fig. 8 is a perspective view of the bit;

Fig. 9 is an enlarged cross sectional view taken on the line IX—IX of Fig. 5;

Fig. 10 is an enlarged detail view of a feed nut, and

Fig. 11 is a cross sectional view of a portion of the machine showing the bit relative to a bearing.

The reconditioning machine disclosed in the pending application above referred to includes a base 1 and at one end of said base are opposed V-jaws 2 provided with flexible hold-down clamping members 3, preferably in the form of cables which have the loop ends 4 thereof anchored between ears 5 carried by the jaws 2. The opposite ends of the flexible members 3 are provided with exteriorly screwthreaded members 6 extending between lugs 7 of the jaws 2 and provided with nuts 8 which may be rotated against the lugs 7 to pull upon the flexible members 3 and cause said members to cooperate with the jaws 2 in providing an anvil and clamping means for bearings 9 and 16 adapted to have an arbor or spindle 10 rotate therein.

Adjacent the anvil are clamping means for holding a connecting rod 11, said clamping means being arranged on ways 12 and including an adjustable support 13 and adjustable jaws 14. The support 13 is adapted to engage the lower face of the rod 11, as viewed in Fig. 4, and the jaws 14 engage the sides of the rod. The engagement of these elements is such as to support the rod 11 with its large bearing 15 in position for the arbor 10 to extend therethrough, and after the large bearing 15 has been properly alined and adjusted for a reaming or boring operation, the jaws 14 can be tightened to firmly hold the shank of the connecting rod while operations are performed upon the large bearing 15.

The bearing 16 has its inner end provided with a yoke 17 and in the ends of the yoke are adjustable screws 18 adapted to engage the connected ears or lugs 19 of the bearing 15, said bearing being composed of semi-cylindrical halves clamped together to retain a bushing 20 within the bearing. The screws 18 are adapted to force the large bearing 15 against the end of the yoke 17 and this adjustment is only temporarily made until the large bearing 15 has been properly centered by a cone member 21 slidable on the arbor 10 and adapted to enter the end of the bearing 15 to properly center said bearing about the arbor 10. After this adjustment has been made the screws 18 can be adjusted to positively hold the bearing 15 in the yoke and the jaws 14 may be further clamped in engagement with the connecting rod, whereby the connecting rod will be firmly held for operations upon it.

One end of the arbor or spindle 10 may be driven by power or by a hand crank 22, and the opposite end of the arbor is provided with a detachable and reversible feed screw 23. The screw 23 has reduced ends 24 provided with spring pressed detents 25. Either of the reduced ends 24 may be placed in a recess or socket 26 in the end of the arbor 10, and the detent 25 is adapted to snap into an opening 27 communicating with the socket 26, thus anchoring the screw 23 as a continuation of the arbor 10.

On the screw 23 is a split nut 28 through which the screw is adapted to feed, said nut having clamping means 29 so that it may be adjusted relative to the screw. The nut also has an opening 30 and extending therein is a detachable arm 31 mounted in the bearing 16, said arm holding the nut 28 stationary so that the screw 23 may feed therein and shift the arbor 10 relative to the connecting rod bearing 15. After the reaming or boring operation has been performed the arm 31 can be removed, the screw 23 detached from the arbor and reversed, and the arbor and screw shifted until the arm 31 may be replaced, thus placing the arbor and its feeding means in condition for another reaming or boring operation.

The arbor 10 is provided with a facet 32 for a bit 33 having a shank 34 extending into a socket 35 provided therefor in the arbor 10. Opposing the socket 35 is a recess 36 for a screw 37 which enters the shank 34 of the bit and clamps said bit on the facet 32, while end walls at the ends of the facet 32 prevent the bit 33 from rotating on the facet.

The bit 33 is of novel construction, best shown in Figs. 2, 3, 4 and 8. It has beveled or convex facets 38 and 39 which provide clearance for chips or borings removed from the bushing 20 by a cutting edge 40 at the juncture of four walls 41, 42, 43 and 44. The wall 42 is inclined one degree and thirty minutes from the horizontal; the wall 43 inclined one degree and thirty minutes from the vertical; the wall 41 inclined seven degrees inwardly from the vertical, and the wall 44 forming part of a clearance groove 45 intersecting the ridge 46 between the facets 38 and 39 and from which ridge the cutting or reaming tooth is formed by the walls 41 to 44 inclusive. While the cutting edge 40 performs a reaming or cutting the wall 42 accomplishes a burnishing of the reamed or bored surface, and the wall 41 is practically a continuation of a beveled end wall 47 of the bit. This bit and its angular walls has been worked out to the thousandths part of an inch so that one operation on the bushing 20 will place the same in perfect condition, without additional operation, and this alone saves time and labor.

The cone member 21 is slotted, as at 48, to provide clearance for the bit 33, particularly when clamping the bearing 15 in position for a reaming or boring operation.

As the arbor 10 is driven the bit will accurately ream out and burnish the bushing 20 and after the bit has traversed the bushing the feed screw may be detached, the arbor retracted and the feed screw again installed in a reverse position, thus placing the machine in condition for another operation. It is obvious that without removing the arbor 10 other bits may be installed or shims used to increase the radial distance of the cutting edge 40 from the axis of the arbor 10.

It is thought that the operation and utility of my reaming and boring machine will be apparent without further description and while in the drawing there is illustrated a preferred embodiment of my invention, it is to be understood that the structural elements are susceptible to such variations as fall within the scope of the appended claim.

What I claim is:

A reconditioning machine comprising a base, clamping means on said base adapted for holding a bearing of a connecting rod, a rotatable arbor detachably supported on said base and adapted to extend through the bearing of the connecting rod, a reversible feed screw coaxially of said arbor, said feed screw having reduced ends either of which may be placed in an end of said arbor, a detent in each reduced end of said feed screw engageable with the end of said arbor for securing said feed screw thereto, a nut on said feed screw, and an arm disposed above said feed screw and having the ends thereof detachably mounted in said nut and in said base so that said nut will be held stationary relative to said base yet permit of said nut being adjusted when said arm is removed therefrom, and a bit carried by said arbor and adapted to be shifted through the bearing of said connecting rod by rotation of said arbor.

In testimony whereof I affix my signature.

GEORGE W. BENEDICT.